3,488,920
SOLVENT EXTRACTION OF HF-CONTAINING MIXTURES
William M. Hutchinson, Bartlesville, Okla., assignor to Phillips Petroleum Company, a corporation of Delaware
No Drawing. Filed Feb. 8, 1968, Ser. No. 703,863
Int. Cl. B01d 53/04
U.S. Cl. 55—56        6 Claims

ABSTRACT OF THE DISCLOSURE

Separation of hydrogen fluoride from mixtures of gases containing same comprising extracting the hydrogen fluoride with a tetrahydrothiophene 1,1-dioxide such as a sulfolane at a temperature in the range between −40° C. and 150° C. Hydrogen fluoride is subsequently recovered by heating the HF-rich absorbent at a temperature at least 50° C. higher than the absorption temperature.

Background of the invention

This invention relates to a process for separating hydrogen fluoride from a mixture comprising hydrogen fluoride. In accordance with another aspect, this invention relates to the solvent extraction of hydrogen fluoride from mixtures containing same with a sulfolane solvent. In accordance with a further aspect, this invention relates to a solvent extraction process using a sulfolane as a solvent that selectively absorbs hydrogen fluoride in the presence of other hydrogen halides.

In many industrial processes, process effluents comprising hydrogen halides are produced. It is highly desirable in many instances to separate these hydrogen halides from the other materials present in the product streams. Hydrogen fluoride, for example, as well as hydrogen chloride, are often produced as by-products in such processes as dehalogenation and dehydrohalogenation processes. The present invention relates to a process for solvent extracting hydrogen fluoride from mixtures containing same.

Accordingly, an object of this invention is to provide a novel process for the separation of hydrogen halides from mixtures containing same.

Another object of this invention is to provide a solvent extraction process effective for selectively removing hydrogen fluoride from mixtures containing same.

A further object of this invention is to provide a solvent extraction process effective for removing hydrogen fluoride from mixtures containing same as well as other hydrogen halides.

Other aspect, objects, and the several advantages of this invention will be obvious to one skilled in the art from the following disclosure and the appended claims.

Summary of the invention

In accordance with this invention, hydrogen fluoride is separated from a mixture containing same by selectively extracting the hydrogen fluoride in a solvent comprising at least one tetrahydrothiophene 1,1-dioxide.

In accordance with one embodiment of this invention, hydrogen fluoride is separated from a gaseous mixture containing hydrogen fluoride by contacting with a sulfolane as solvent.

In accordance with a further embodiment of this invention, hydrogen fluoride is separated from gaseous mixtures containing hydrogen fluoride and hydrogen chloride by selectively extracting the hydrogen fluoride by contacting with a sulfolane compound as defined herein.

Description of preferred embodiments

The solvents of the invention comprise tetrahydrothiophene 1,1-dioxide compounds having the formula

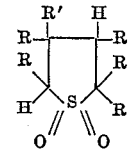

wherein each R is selected from hydrogen, methyl and ethyl radicals, and R' is selected from hydrogen and alkoxy radicals having 1–5 carbon atoms.

Representative examples of tetrahydrothiophene 1,1-dioxide that can be employed in the process of this invention include:

tetrahydrothiophene 1,1-dioxide (sulfolane)
tetrahydro-2-methylthiophene 1,1-dioxide
tetrahydro-3-methylthiophene 1,1-dioxide
tetrahydro-2-ethylthiophene 1,1-dioxide
tetrahydro-3-ethylthiophene 1,1-dioxide
tetrahydro-2,5-dimethylthiophene 1,1-dioxide
tetrahydro-3,4-diethylthiophene 1,1-dioxide
tetrahydro-3-methyl-2,5-diethylthiophene 1,1-dioxide
tetrahydro-2,3,4,5-tetramethylthiophene 1,1-dioxide
tetrahydro-2,2,3,4,5-pentaethylthiophene 1,1-dioxide
tetrahydro-3-methoxythiophene 1,1-dioxide
tetrahydro-3-ethoxythiophene 1,1-dioxide
tetrahydro-2-methyl-3-isopropoxythiophene 1,1-dioxide
tetrahydro-2-ethyl-3-methyl-4-tert-butoxythiophene 1,1-dioxide
tetrahydro-2,2,3,4,5-pentaethyl-4-pentoxythiophene 1,1-dioxide and the like, and mixtures thereof.

The process of this invention is applicable to the separation of hydrogen fluoride from gaseous mixtures containing hydrogen fluoride and any of a number of other materials. Examples of some materials from which hydrogen fluoride can be thus separated include hydrocarbons such as methane, ethane, propane, butane, isobutane, hexane, cyclopentane, methylcyclopentane, cyclohexane, ethylene, propylene, isobutylene, 1-butene, 2-butene, acetylene, methylacetylene, cyclopentene, cyclohexene, and benzene; halogenated hydrocarbons such as carbon tetrachloride, chloroform, methyl chloride, methyl bromide, ethyl chloride, 1,2-dichloroethane, carbon tetrafluoride, fluoroform, methylene fluoride, methyl fluoride, 1,2-difluoroethane, 1,1,2,2-tetrafluoroethane, 1,1,1,2-tetrafluoroethane, hexafluoroethane, 1,1,2,2-tetrafluorocyclobutane, octafluorocyclobutane, vinyl fluoride, 1,2-difluoroethylene, 1,1-difluoroethylene, trifluoroethylene, tetrafluoroethylene, 1,2-dichlorotetrafluoroethane, chlorotrifluoroethylene, and bromotrifluoroethylene; and inorganic chemicals such as hydrogen chloride, hydrogen bromide, hydrogen, nitrogen, carbon monoxide, carbon dioxide, helium, neon, and argon.

The process is particularly useful for separating hydrogen fluoride from reaction mixtures resulting from the dehalogenation of 1,2-dichlorotetrafluoroethane by reaction with hydrogen, e.g., in processes such as those disclosed in U.S. 2,615,925, U.S. 2,697,124, and Belgian 553,363. For instance, whereas in the past the effluent from the dehalogenation reactor is first freed of both hydrogen fluoride and hydrogen chloride, e.g., by passing the effluent through water or aqueous caustic, in my process hydrogen fluoride is first separated from the effluent by extraction with the tetrahydrothiophene 1,1-dioxide solvent. The hydrogen chloride can then be separated from the remainder of the effluent, e.g., by passing the remainder of the effluent through water or aqueous caustic.

Although the scrubbing or extraction of hydrogen fluoride from the gaseous mixture by the process of this invention can be carried out over a considerable temperature range, the temperature will generally be within the range of about −40° C. to 150° C., preferably being within the range of about 0° C. to 70° C. The partial pressure of hydrogen fluoride in the mixture from which the hydrogen fluoride is scrubbed can vary over a broad range but will generally be at least 1 mm. Hg.

The hydrogen fluoride is readily recovered from the tetrahydrothiophene 1,1-dioxide solvent by the application of heat. Although a considerable range of temperatures can be used in this stripping of the hydrogen fluoride from the solvent, the temperature will generally be within the range of about 150° C. to 280° C., preferably being within the range of about 180° C. to 220° C. The temperature during the stripping operation should be at least 50° C. higher than that used in the scrubbing operation. Although the stripping operation can be carried out at a pressure substantially above or below atmospheric, approximately atmospheric pressure is preferred. Pressures below atmospheric are readily used, e.g., when the recovered hydrogen fluoride is collected in a chilled barometric leg. If desired, a purge gas such as nitrogen, carbon dioxide, helium, neon, argon, or the like, can be passed through the solvent after the stripping operation to aid in removing traces of hydrogen fluoride remaining in the solvent.

It should be understood that the tetrahydrothiophene 1,1-dioxides described hereinabove can be used by themselves, or in admixture with each other, in the purification of gases. These may be also used in conjunction with other agents which can be employed in the purification of gases, such as aromatic hydrocarbons and nuclearly chlorinated derivatives thereof, particularly such agents having an atmospheric boiling point above about 200° C., e.g., biphenyl, o- and m-terphenyl, 1- and 2-phenylnaphthalene, alkyl and nuclearly chlorinated derivatives of the above named aromatic hydrocarbons, and the like, and mixtures thereof.

It must be appreciated that the products of this invention can be used for the purification of gases over a very wide range of temperatures, pressures and compositions. It is not intended to limit this invention in a manner to any specific temperature or temperature range, any specific pressure or range of pressures, or any specific gas, composition of gas, or concentration of components in said gas. The products of this invention can be used for the purification of gases under all of the conditions heretofore employed with other agents for the removal of hydrogen fluoride from gaseous mixtures containing same.

Although either the extraction or the stripping operation can be carried out batchwise, continuous operation is preferred for both the solvent extraction contacting and stripping operation for freeing the solvent of absorbed hydrogen fluoride. The solvent, of course, can be reused in the solvent extraction step.

EXAMPLE I

The solubility of hydrogen fluoride at various pressures in sulfolane (tetrahydrothiophene 1,1-dioxide) at various temperatures was determined. The results of these determinations are summarized in Table I.

TABLE I

| Temperature, ° C. | Pressure, mm. Hg | Solubility, g. HF/100 g./ Sulfolane |
|---|---|---|
| 30 | 12 | 1.7 |
| 30 | 21 | 5.7 |
| 30 | 33 | 10.1 |
| 30 | 67 | 17.1 |
| 65 | 42 | 1.22 |
| 65 | 68 | 5.99 |
| 149.5 | 565 | 2.18 |
| 149.5 | 706 | 2.72 |
| 199 | 550 | 0.13 |
| 199 | 690 | 0.14 |

The data in Table I show that at the lower temperatures sulfolane is a good solvent for hydrogen fluoride, and that at the higher temperatures the solubility of hydrogen fluoride in sulfolane is quite low. Thus, hydrogen fluoride is readily absorbed by sulfolane at low temperatures, and is easily stripped from the sulfolane at higher temperatures.

EXAMPLE II

The solubility of hydrogen chloride at various pressures in sulfolane at various temperatures was determined. The results of these determinations are summarized in Table II.

TABLE II

| Temperature, ° C. | Pressure, mm. Hg | Solubility, g. HCl/100 g./ Sulfolane |
|---|---|---|
| 30 | 16 | 0.14 |
| 30 | 55 | 0.60 |
| 30 | 72 | 0.82 |
| 30 | 83 | 0.91 |
| 65 | 37 | 0.12 |
| 65 | 98 | 0.30 |
| 65 | 192 | 0.63 |
| 65 | 288 | 1.06 |
| 149.5 | 139 | 0.03 |
| 149.5 | 354 | 0.07 |

The data in Table II show that under the conditions investigated the solubility of hydrogen chloride in sulfolane is quite low. A comparison of the data in Table I with those in Table II shows that sulfolane can be used to selectively extract hydrogen fluoride from a mixture comprising hydrogen fluoride and hydrogen chloride.

The solubility of tetrafluoroethylene at 256 mm. Hg in sulfolane at 30° C. was found to be only 0.07 g./100 g. sulfolane. Thus, sulfolane can be used to selectively extract hydrogen fluoride from a mixture comprising hydrogen fluoride, hydrogen chloride, and tertafluoroethylene.

I claim:

1. A process for separating hydrogen fluoride from a mixture of gases containing same which comprises extracting hydrogen fluoride from said mixture by contacting with at least one tetrahydrothiophene 1,1-dioxide having the formula

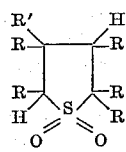

wherein each R is selected from hydrogen, methyl and ethyl radicals, and R′ is selected from hydrogen and alkoxy radicals having from 1 to 5 carbon atoms.

2. A process according to claim 1 wherein said contacting is effected at a temperature within the range −40° to 150° C.

3. A process according to claim 1 wherein said tetrahydrothiophene 1,1-dioxide is sulfolane.

4. A process according to claim 1 wherein said mixture is obtained as the effluent from a dehalogenation reaction wherein halofluorocarbon compounds are converted to an effluent comprising hydrogen fluoride and halogenated hydrocarbons and hydrogen fluoride is selectively removed from the effluent by said contacting.

5. A process according to claim 1 wherein the absorbed hydrogen fluoride is recovered from the tetrahydrothiophene 1,1-dioxide solvent by heating to a temperature at least 50° C. higher than that used during said contacting.

6. A process according to claim 1 wherein said mixture comprises hydrogen chloride as well as hydrogen fluoride and the hydrogen fluoride is selectively extracted during said contacting.

References Cited

UNITED STATES PATENTS 3,347,621  10/1967  Papadopoulis et al. _____ 23—2

REUBEN FRIEDMAN, Primary Examiner

R. W. BURKS, Assistant Examiner

U.S. Cl. X.R.

55—71